US011510280B2

(12) United States Patent
Takahashi et al.

(10) Patent No.: US 11,510,280 B2
(45) Date of Patent: Nov. 22, 2022

(54) RADIO COMMUNICATION SYSTEM AND RADIO BASE STATION

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/496,188

(22) PCT Filed: Mar. 20, 2018

(86) PCT No.: PCT/JP2018/010923
§ 371 (c)(1),
(2) Date: Sep. 20, 2019

(87) PCT Pub. No.: WO2018/174038
PCT Pub. Date: Sep. 27, 2018

(65) Prior Publication Data
US 2020/0022215 A1    Jan. 16, 2020

(30) Foreign Application Priority Data

Mar. 23, 2017 (JP) .............................. JP2017-057948
Mar. 30, 2017 (JP) .............................. JP2017-068900

(51) Int. Cl.
*H04W 88/02* (2009.01)
*H04W 76/36* (2018.01)
(Continued)

(52) U.S. Cl.
CPC ....... *H04W 88/023* (2013.01); *H04W 28/085* (2013.01); *H04W 76/19* (2018.02);
(Continued)

(58) Field of Classification Search
None
See application file for complete search history.

(56) References Cited

U.S. PATENT DOCUMENTS 10,873,985 B2 * 12/2020 Wu .................... H04W 36/305
2015/0124743 A1 * 5/2015 Damnjanovic ....... H04W 76/15
370/329
(Continued)

FOREIGN PATENT DOCUMENTS

| EP | 3796741 A2 | 3/2021 |
| WO | 2015/140038 A1 | 9/2015 |
| WO | 2016/028563 A1 | 2/2016 |

OTHER PUBLICATIONS

R2-142406 NEC "Discussion on S-RLF recovery" 3GPP RAN2 #86 Seoul May 19-23, 2014. (Year: 2014).*
(Continued)

*Primary Examiner* — Basil Ma
(74) *Attorney, Agent, or Firm* — Osha Bergman Watanabe & Burton

(57) ABSTRACT

A user equipment is disclosed including a receiver that receives an RRC message related to configuration information of a second radio base station for a split hearer that splits from the second radio base station toward a first radio base station, and a processor that releases resources related to a radio link of the second radio base station based on the RRC message when a radio link failure in the second radio base station is detected.

14 Claims, 14 Drawing Sheets

(51) Int. Cl.
*H04W 80/02* (2009.01)
*H04W 28/08* (2009.01)
*H04W 76/19* (2018.01)
*H04W 76/27* (2018.01)

(52) U.S. Cl.
CPC ........... *H04W 76/27* (2018.02); *H04W 76/36* (2018.02); *H04W 80/02* (2013.01)

(56) References Cited

U.S. PATENT DOCUMENTS

| | | | |
|---|---|---|---|
| 2015/0223282 A1 | 8/2015 | Vajapeyam et al. | |
| 2016/0057585 A1* | 2/2016 | Horn | H04L 45/245 370/312 |
| 2016/0219604 A1* | 7/2016 | Fujishiro | H04W 36/04 |
| 2017/0181216 A1* | 6/2017 | Worrall | H04W 76/19 |
| 2018/0278357 A1* | 9/2018 | Kim | H04J 11/0083 |
| 2020/0008255 A1* | 1/2020 | Sharma | H04W 12/0017 |
| 2020/0260494 A1* | 8/2020 | Takahashi | H04W 74/0833 |

OTHER PUBLICATIONS

Office Action in counterpart Japanese Patent Application No. 2019-507678 dated May 19, 2020 (4 pages).
International Search Report issued in Application No. PCT/JP2018/010923, dated Apr. 24, 2018 (3 pages).
Written Opinion issued in International Publication No. PCT/JP2018/010923, dated Apr. 24, 2018 (5 pages).
3GPP TR 38.804 V14.0.0; "3rd Generation Partnership Project; Technical Specification Group Radio Access Network; Study on New Radio Access Technology; Radio Interface Protocol Aspects (Release 14)" Mar. 2017, (57 pages).
3GPP TSG RAN WG2 Meeting #85; R1-140259; "Radio link failure handling for dual connectivity;" Intel Corporation; Feb. 10-14, 2014; Prague, Czech Republic (3 pages).
Office Action issued in the counterpart Japanese Patent Application No. 2019-507678, dated Sep. 15, 2020 (4 pages).
Extended European Search Report issued in counterpart European Patent Application No. 18771826.7, dated Oct. 30, 2020 (8 pages).
NEC; "Discussion on S-RLF recovery"; 3GPP TSG RAN2 Meeting #86, R2-142406; Seoul, South Korea; May 19-23, 2014 (4 pages).
Office Action in counterpart Japanese Patent Application No. 2019-507678 dated Mar. 24, 2021 (3 pages).
Office Action in counterpart African Patent Application No. AP/P/2019/011900 dated Apr. 27, 2021 (4 pages).
Office Action issued in African Application No. AP/P/2019/011900; dated Nov. 1, 2021 (5 pages).
3GPP TSG-RAN WG2 Meeting #87; R2-144540 "Report and summary of email discussion [87#22] [LTE/DC] S-RLF and Reestablishment" Huawei (Rapporteur); Shanghai, China; Oct. 6-10, 2014 (29 pages).
Office Action issued in European Application No. 18771826.7; dated Jul. 13, 2021 (6 pages).
Office Action issued in Indian Application No. 201937039353; dated Jan. 7, 2022 (6 pages).
Office Action issued in European Application No. 18771826.7; dated Jan. 20, 2022 (4 pages).

* cited by examiner

RADIO COMMUNICATION SYSTEM AND RADIO BASE STATION

TECHNICAL FIELD

The present invention relates to a radio communication system and a radio base station that are capable of configuring a split bearer.

BACKGROUND ART

3rd Generation Partnership Project (3GPP) specifies Long Term Evolution (LTE), and with an aim of further speeding, specifies LTE-Advanced (hereinafter, it is assumed that the LTE includes the LTE-Advanced). Moreover, in the 3GPP, specifications of a successor system of the LTE called 5G New Radio (NR) and the like are being studied.

Specifically, as a type of a bearer in dual connectivity (DC) using a radio base station of an LTE system and a radio base station of an NR system, a split bearer via a secondary cell group (SCG) (Split bearer via SCG) is stipulated in Non-Patent Document 1.

In the Split bearer via SCG, when a master base station is the radio base station of the LTE system (hereinafter, "LTE MeNB") and a secondary base station is the radio base station of the NR system (hereinafter, "NR SgNB" or simply "SgNB"), the bearer for a user plane (S1-U) between a core network and the radio base station is configured only between the core network (EPC (Evolved Packet Core)) and the NR SgNB. The bearer splits toward the LTE MeNB at the PDCP layer of the NR SgNB and constitutes a split bearer.

User data (for example, downlink data) is transmitted to a user device (UE) from the LTE MeNB and the NR SgNB via the split bearer. Accordingly, the dual connectivity using the LTE MeNB and the NR SgNB is realized.

PRIOR ART DOCUMENT

Non-Patent Document

Non-Patent Document 1: 3GPP TR 38.804 VI4.0.0 Section 5.2.1.2 Bearer types for DualConnectivity between LTE and NR, 3rd Generation Partnership Project; Technical Specification Group Radio Access Network; Study on New Radio Access Technology; Radio Interface Protocol Aspects Release 14), 3GPP, March 2017

SUMMARY OF THE INVENTION

As explained above, a configuration in which, when a secondary base station is a radio base station of the NR system (NR SgNB), LTE MeNB forms a macro cell and the NR SgNB forms a small cell is stipulated in Non-Patent Document 1.

In such a configuration, when UE moves, it is assumed that the UE frequently goes out of the coverage area of the small cell. Therefore, if a split bearer via the SCG is configured, it becomes necessary to release that split bearer and reconfigure a new bearer via only a master cell group (MCG).

Furthermore, it is assumed that when the UE moves into the coverage area of the small cell after the split bearer is released, a new split bearer is configured and the dual connectivity is resumed. In other words, increase in the signaling amount due to such release and configuration of the split bearer becomes a concern.

As a solution to such a problem, one approach is to use a mechanism stipulated in LTE Release-12. Specifically, in the LTE Release-12, it is stipulated that, upon detecting a radio link failure (RLF), a certain radio base station (SeNB) that forms Primary SCell (PSCell) reports to the master base station (MeNB) the RLF, and the MeNB that receives the report performs operation to remove the SCG. In such a configuration, to suppress the increase in the signaling amount due to the release and configuration of the split bearer explained above, a solution in which the MeNB that receives the report can retain the SCG without removing the same can be thought.

However, if the SCG is retained regardless of the occurrence of the RLF, the PSCell and SCell remain active, that is, a connected state (RRC Connected state) in the radio resource control layer (RRC layer) of these cells is maintained. Consequently, the UE periodically repeats the quality measurement of the cells and reporting (measurement report), and higher power consumption becomes a problem.

The present invention has been made in view of the above circumstances. It is an object of the present invention to provide a radio communication system and a radio base station capable of reducing power consumption of a user device and suppressing the increase in the signaling amount due to repeated release and configuration of a split bearer, even when a split bearer via a secondary cell group (SCG) is configured.

According to one aspect of the present invention, a radio communication system is capable of configuring a split bearer that goes from a core network via a secondary cell group and from the secondary cell group splits toward a radio base station included in a master cell group, and data is transmitted to a user device via the split bearer. The radio base station includes a connection controlling unit that transmits to the user device a connection message to configure the split bearer. The connection message includes an information element that allows deactivation of the secondary cell group under a predetermined condition. The user device includes a cell setting unit that deactivates setting of a cell included in the secondary cell group when the received connection message includes the information element and a radio link failure in the secondary cell group is detected.

According to another aspect of the present invention, a radio base station included in a radio communication system that is capable of configuring a split bearer that goes from a core network via a secondary ceil group and from the secondary cell group splits toward a radio base station included in a master cell group, and in which data is transmitted to a user device via the split bearer, includes a connection controlling unit that transmits to the user device a connection message to configure the split bearer. The connection message includes an information element that allows deactivation of the secondary cell group under a predetermined condition.

According to still another aspect of the present invention, a radio communication system is capable of configuring a split bearer that goes from a core network via a secondary cell group and from an another radio base station included in the secondary cell group splits toward a radio base station included in a master cell group, and data is transmitted to a user device via the split bearer. The radio base station includes a failure notification receiving unit that receives from the user device a failure notification that indicates that a radio link failure in the secondary cell group has occurred; and a connection controlling unit that transmits to the another radio base station, when the failure notification receiving unit receives the failure notification, a resource modification request that instructs to release only resources from a predetermined layer and below in the secondary cell group of the split bearer. The another radio base station includes a resource controlling unit that releases, based on the received resource modification request, the resources from the predetermined layer and below in the secondary cell group of the split bearer.

According to still another aspect of the present invention, a radio base station included in a radio communication system that is capable of configuring a split bearer that goes from a core network via a secondary cell group and from a radio base station included in the secondary cell group splits toward a master cell group, and in which data is transmitted to a user device via the split bearer, includes a failure notification receiving unit that receives from the user device a failure notification that indicates that a radio link failure in the secondary cell group has occurred; and a resource controlling unit that releases, when the failure notification receiving unit receives the failure notification, only resources from a predetermined layer and below in the secondary cell group of the split bearer.

According to still another aspect of the present invention, a radio communication system is capable of configuring a split bearer that goes from a core network via a secondary cell group and from the secondary cell group splits toward a radio base station included in a master cell group, and data is transmitted to a user device via the split bearer. The radio base station includes a connection controlling unit that transmits to the user device a connection message to configure the split bearer. The connection message includes an information element that allows removal of an identifier of a ceil quality measurement in the secondary cell group. The user device includes a cell setting unit that stops quality measurement of cells included in the secondary cell group when the received connection message includes the information element and a radio link failure in the secondary cell group is detected.

MODES FOR CARRYING OUT THE INVENTION

Figure 1:
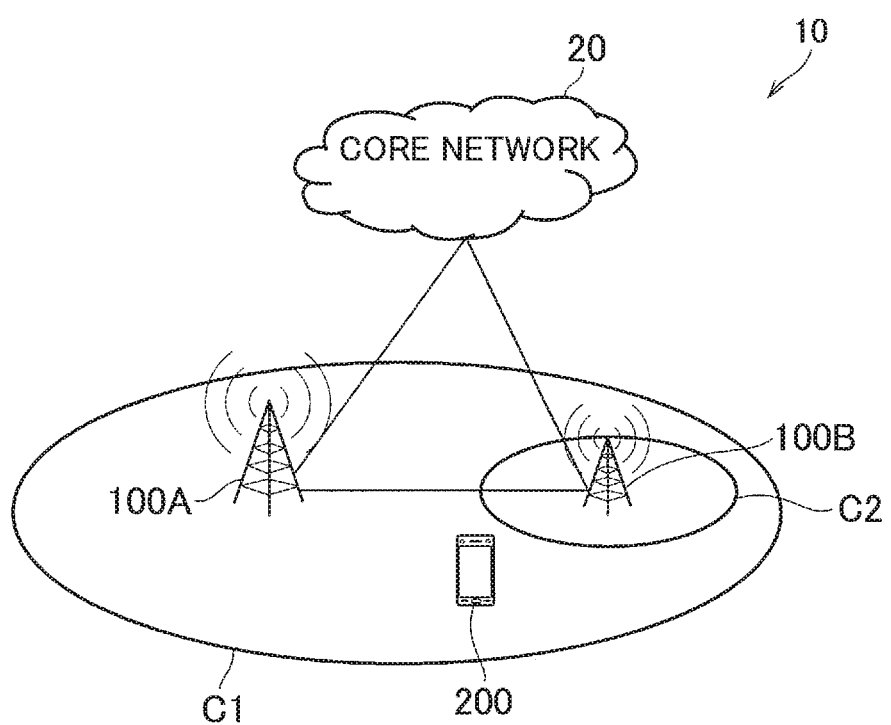
FIG. 1 is an overall structural diagram of a radio communication system 10.

Exemplary embodiments of the present invention are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system that uses the Long Term Evolution (LTE) and the 5G New Radio (NR), and includes a core network 20 and a user device (User Equipment) 200 (hereinafter, "UE 200"). A radio base station 100A (hereinafter, "eNB 100A") and a radio base station 100B (hereinafter, "gNB 100B") are connected to the core network 20.

The core network 20 can be a core network of the LTE system (EPC (Evolved Packet Core)) or can be a core network of the NR system (NextGen Core).

In the present embodiment, the eNB 100A is a radio base station (eNB) of the LTE system and can constitute a master base station. Hereinafter, the eNB 100A will be appropriately represented as LTE MeNB. The gNB 100B is a radio base station (gNB) of the NR system, and can constitute a secondary base station. Hereinafter, the gNB 100B will be appropriately called as NR SgNB (or simply SgNB).

The eNB 100A forms a cell C1. The gNB 100B forms a cell C2. In the present embodiment, the cell C1 is a macro cell and the cell C2 is a small cell. Alternatively, the cell C1 and the cell C2 can be formed in a plurality.

A master cell group (MCG) is constituted by the cell C1 formed by the eNB 100A. A secondary cell group (SCG) is constituted by the cell C2 formed by the gNB 100B.

Figure 2:
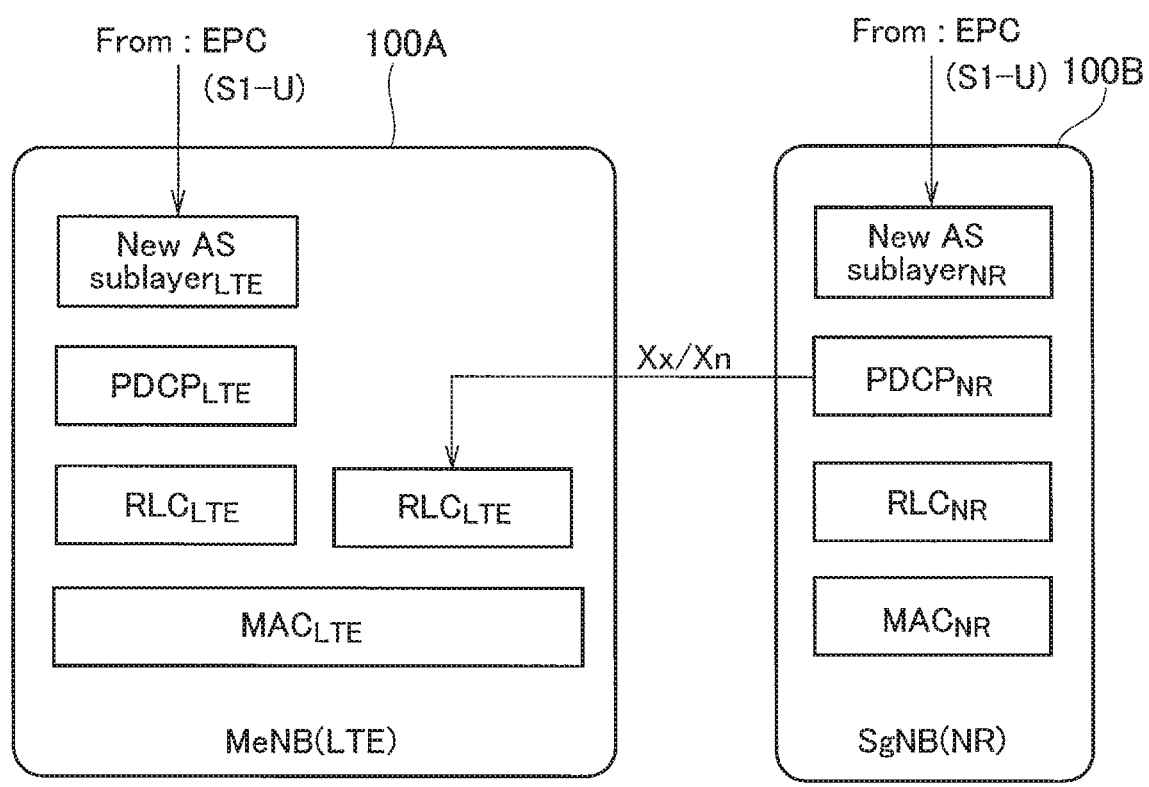
FIG. 2 is a diagram showing a protocol stack of eNB 100A (LTE MeNB) and gNB 100B (NR SgNB).

FIG. 2 shows a protocol stack of the eNB 100A (LTE MeNB) and the gNB 100B (NR SgNB). As shown in FIG. 2, the eNB 100A includes MAC (Medium Access Control) layer ($MAC_{LTE}$), RLC (Radio Link Control) layer ($RLC_{LTE}$), PDCP (Packet Data Convergence Protocol) layer ($PDCP_{LTE}$), and AS (Access Stratum) sublayer (New AS sublayer$_{LTE}$).

Similarly, the gNB 100B includes MAC (Medium Access Control) layer ($MAC_{NR}$), RLC (Radio Link Control) layer ($RLC_{NR}$), PDCP (Packet Data Convergence Protocol) layer ($PDCP_{NR}$), and AS (Access Stratum) sublayer (New AS sublayer$_{NR}$). The New AS sublayer$_{NR}$ is necessary when connecting to the NextGen Core. When connecting to the EPC, layers stipulated as per the conventional QoS mechanism are necessary.

A control plane (C plane) and a user plane (U plane) are configured between the core network 20 (EPC) and the eNB 100A, but only the U plane is configured between the core network 20 (EPC) and the gNB 100B.

Each of the eNB 100A and the gNB 100B includes a not-shown physical layer below the MAC layer. Moreover, the AS sublayer (New AS sublayer$_{LTE}$ and New AS sublayer$_{NR}$) includes RRC (Radio Resource Control) such as RRC Connection Reconfiguration and the like explained later.

The eNB 100A and the gNB 100B are connected to the core network 20 (EPC) via S1-U interface. Moreover, the eNB 100A and the gNB 100B are connected to each other via X interface (Xx/Xn). As shown in FIG. 2, the eNB 100A includes the RLC layer ($RLC_{LTE}$) for the X interface, and connects to the PDCP layer ($PDCP_{NR}$) of the gNB 100B via the X interface.

Moreover, in the present embodiment, a split bearer $B_{SP}$ (not shown in FIG. 2, refer to FIG. 6 and the like) that goes from the core network 20 via the secondary cell group (SCG) and from the secondary cell group splits toward the radio base station (eNB 100A) included in the master cell group (MCG), specifically, Split bearer via SCG is configured.

Data transmitted to the UE 200 from the core network 20, specifically, downlink user data is transmitted to the UE 200 via the split bearer $B_{SP}$.

(2) Functional Block Configuration of Radio Communication System

A functional block configuration of the radio communication system 10 is explained below. Specifically, functional block configurations of the eNB 100A and the UE 200 are explained below.

(2.1) eNB 100A and gNB 100B

Figure 3:
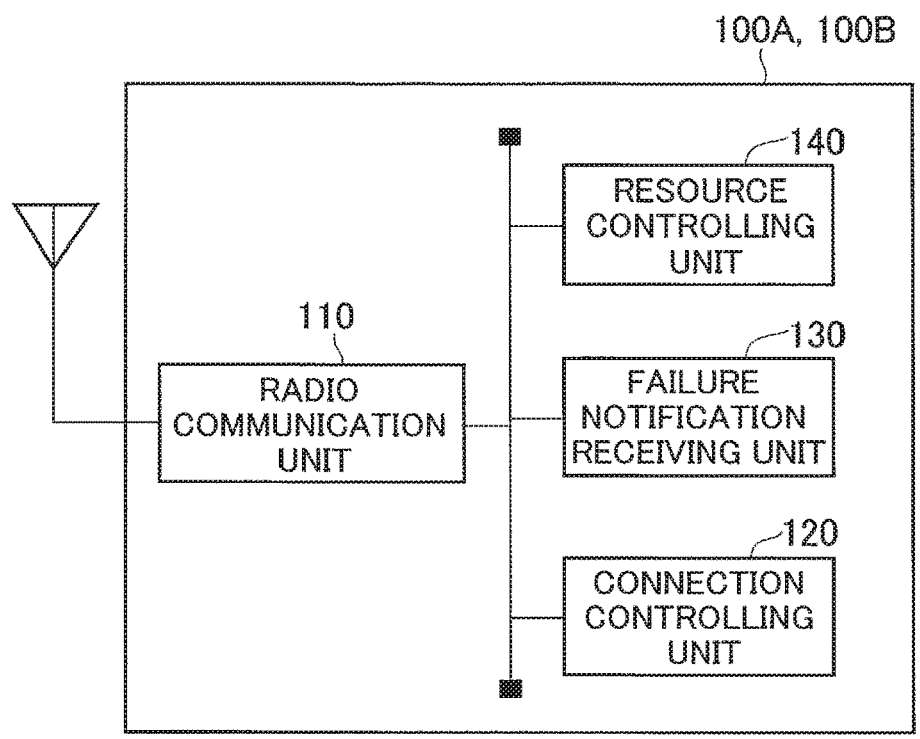
FIG. 3 is a functional block diagram of the eNB 100A and the gNB 100B.

FIG. 3 is a functional block diagram of the eNB 100A and the gNB 100B. Hereinafter, unless particularly stated, the eNB 100A is cited as an example. As explained above, the gNB 100B is different from the eNB 100A in that the gNB 100B is the radio base station of the NR system and constitutes the secondary base station in the present embodiment.

As shown in FIG. 3, the eNB 100A includes a radio communication unit 110, a connection controlling unit 120, a failure notification receiving unit 130, and a resource controlling unit 140.

The eNB 100A provides functions of each layer in the protocol stack shown in FIG. 2 via the functional blocks shown in FIG. 3. Furthermore, in FIG. 3, only the functional blocks related to the present invention are shown.

The radio communication unit 110 performs radio communication using the LTE system. Specifically, the radio communication unit 110 transmits to/receives from the UE 200 a radio signal using the LTE system. The user data or control data is multiplexed in the radio signal.

The connection controlling unit 120 controls the connection between the eNB 100A and the UE 200, and the connection between the eNB 100A and the gNB 100B. Specifically, the connection controlling unit 120 controls the connections with the UE 200 in the RRC lager. Moreover, the connection controlling unit 120 controls the connections with the gNB 100B via the X interface (Xx/Xn).

Figure 6:
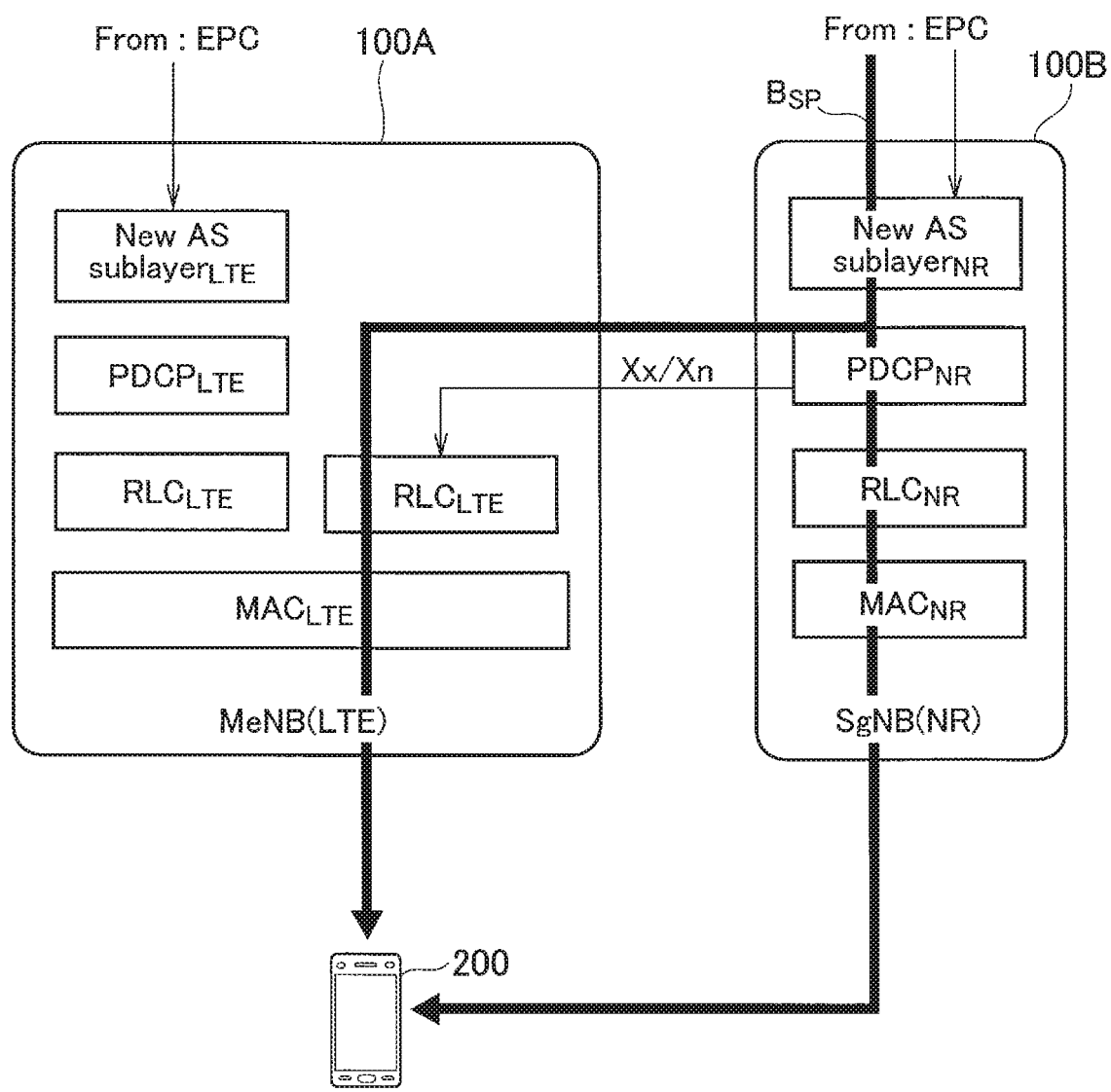
FIG. 6 is a diagram showing a configuration example of a split bearer $B_{SP}$ (Split bearer via SCG) (Operation Example 1).

In particular, in the present embodiment, the connection controlling unit 120 transmits to the UE 200 a connection message (RRC message) to configure the split bearer $B_{SP}$ (refer to FIG. 6 and the like). Specifically, the connection controlling unit 120 is capable of transmitting to the UE 200 the RRC Connection Reconfiguration that includes an information element that allows the UE 200 to deactivate the secondary cell group (SCG) under a predetermined condition.

In the present embodiment, "to deactivate" means to retain the resources used for configuring the split bearer $B_{SP}$ without releasing, and, as an operation of the UE 200, not to transmit any uplink signal of the cell, and not to monitor PDCCH, too. The UE 200 performs a downlink quality measurement by using downlink synchronization/reference signals and the like, but the measurement period is longer than that of in the RRC Connected state.

Moreover, the connection controlling unit 120 can transmit to the UE 200 the RRC Connection Reconfiguration that includes an information element that allows the UE 200 to remove an identifier of the cell quality measurement in the SCG. Specifically, the RRC Connection Reconfiguration can include an information element that allows the UE 200 to remove MeasId that is used for identifying the quality measurement performed by the UE 200 of Primary SCell (PSCell) and Secondary Cell (SCell) included in the SCG.

Specifically, the MeasId is stipulated in Chapter 6.3.5 and the like of 3GPP TS36.331, and is used for identifying the configuration of the quality measurement of the cell (for example, the relationship between a measurement object (measObject) and a report configuration (reportConfig)). When the UE 200 removes the MeasId in the SCG, the quality measurement in the SCG is stopped. In other words, when the UE 200 removes the MeasId, the quality measurement in the SCG is not performed.

Moreover, the connection controlling unit 120 can transmit to the gNB 100B (another radio base station) a resource modification request (Secondary Node Modification Request) that instructs to release only the resources from a predetermined layer and below in the SCG of the split bearer $B_{SP}$.

Specifically, when the failure notification receiving unit 130 receives a failure notification (S-RLF), the connection controlling unit 120 can transmit to the gNB 100B the Secondary Node Modification Request that instructs to release the resources from the RLC layer and below, in other words, the resources of the $RLC_{NR}$ and the $MAC_{NR}$ (including the physical layer) of the gNB 100B.

When a part of the resources that constitute the split bearer $B_{SP}$ is released in such a manner, when reconnecting the UE 200 to the same SCG (that is, the gNB 100B) as that before the release of the resources, the connection controlling unit 120 (corresponds to the gNB 100B in the present embodiment) can configure the split bearer $B_{SP}$ in which the released resources are reused.

On the other hand, when a part of the resources that constitute the split bearer $B_{SP}$ is released in the manner explained above, when connecting the UE 200 to a different SCG than that before the release of the resources, the connection controlling unit 120 (corresponds to the gNB 100B in the present embodiment) can configure a new split bearer $B_{SP}$.

The failure notification receiving unit 130 receives from the UE 200 a notification of the radio link failure (RLF) in the master cell group (MCG) and the secondary cell group (SCG). In particular, in the present embodiment, the failure notification receiving unit 130 receives from the UE 200 a failure notification (SCG Failure Information) that indicates that the RLF in the SCG (referred to as S-RLF) has occurred.

The resource controlling unit 140 controls the resources in each layer of the protocol stack shown in FIG. 2. Specifically, the resource controlling unit 140 controls the resources required in each layer according to the set state of the master cell group (MCG) and the secondary cell group (SCG).

In particular, in the present embodiment, the resource controlling unit 140 (corresponds to the gNB 100B in the present embodiment) releases, based on the resource modification request (Secondary Node Modification Request) received from the eNB 100A, the resources from the predetermined layer and below (specifically, from the RLC layer and below) in the SCG of the split bearer $B_{SP}$.

In other words, the resource controlling unit 140 releases only the $MAC_{NR}$ and the $RLC_{NR}$, among the $MAC_{NR}$, the $RLC_{NR}$, the $PDCP_{NR}$, and the New AS sublayer$_{NR}$ (refer to FIG. 2) that constitute the split bearer $B_{SP}$.

(2.2) UE 200

Figure 4:
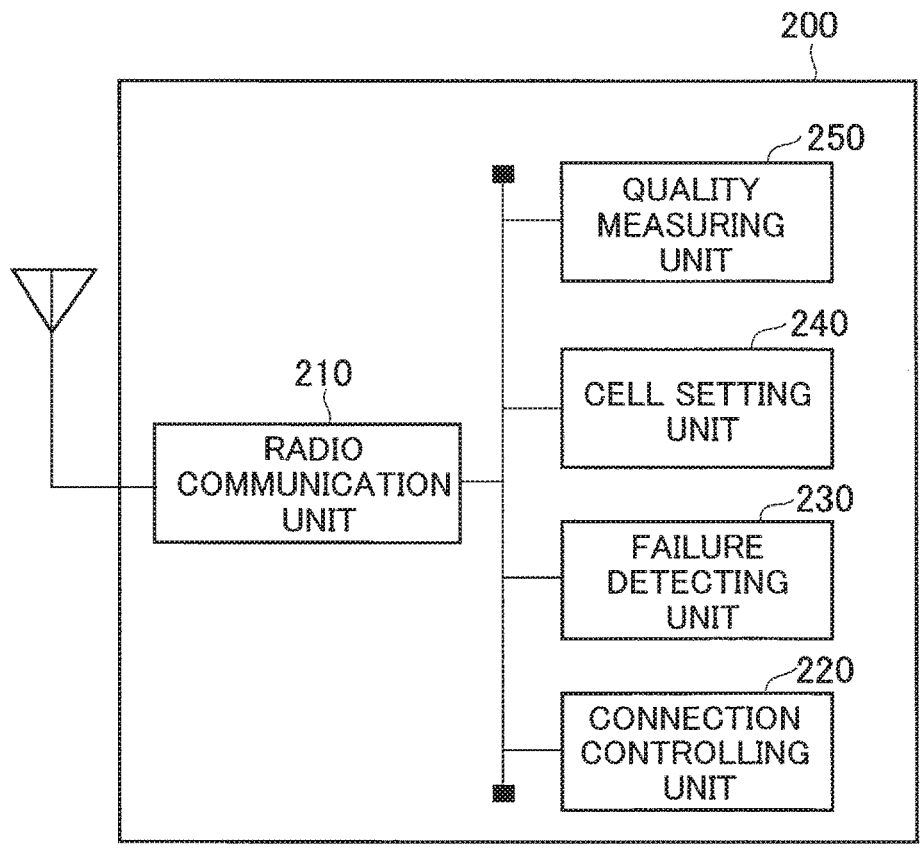
FIG. 4 is a functional block diagram of UE 200.

FIG. 4 is a functional block diagram of the UE 200. As shown in FIG. 4, the UE 200 includes a radio communication unit 210, a connection controlling unit 220, a failure detecting unit 230, a cell setting unit 240, and a quality measuring unit 250. The UE 200 provides functions of each layer in the protocol stack shown in FIG. 2 via the functional blocks shown in FIG. 4. Furthermore, in FIG. 4, only the functional blocks related to the present invention are shown.

The radio communication unit 210 performs radio communication using the LTE system and the NR system. Specifically, the radio communication unit 210 transmits to/receives from the eNB 100A a radio signal using the LTE system. Moreover, the radio communication unit 210 transmits to/receives from the gNB 100B a radio signal using the NR system. The user data or the control data is multiplexed in the radio signal.

The connection controlling unit 220 controls the connection between the UE 200 and the eNB 100A, and the connection between the UE 200 and the gNB 100B. Specifically, the connection controlling unit 220 controls the connections in the RRC layer, based on the connection message (RRC message) transmitted from the eNB 100A or the gNB 100B.

More specifically, the connection controlling unit 220 performs, based on the RRC Connection Reconfiguration received from the eNB 100A (or the gNB 100B), a connection reconfiguration process in the RRC layer. The connection controlling unit 220 transmits to the eNB 100A (or the gNB 100B) RRC Connection Reconfiguration Complete that indicates that the connection reconfiguration process is completed.

The failure detecting unit 230 detects the radio link failure (RLF) in the master cell group (MCG) and the secondary cell group (SCG). In particular, in the present embodiment, based on the detection condition of the RLF stipulated in the 3GPP Technical Standard (TS) (for example, Chapter 10.1.6 of TS36.300), the failure detecting unit 230 detects the RLF in the SCG.

The cell setting unit 240 performs settings related to the cells of the master cell group (MCG) or the secondary cell group (SCG) to which the UE 200 is connectable. Specifically, the cell setting unit 240 deactivates the SCG under a predetermined condition.

More specifically, when the RRC message (RRC Connection Reconfiguration) received by the connection controlling unit 220 includes the information element that allows deactivation, and when the radio link failure (RLF) in the SCG is detected, the cell setting unit 240 deactivates the setting of the cell (the cell C2 in the present embodiment) included in the SCG.

Particularly, in the present embodiment, even when the UE 200 is not allowed to autonomously deactivate the setting of the cell included in the SCG, if the received RRC Connection Reconfiguration includes such an information element and the RLF in the SCG is detected, the cell setting unit 240 deactivates the setting of the cell included in the SCG.

Moreover, when the RRC message (RRC Connection Reconfiguration) received by the connection controlling unit 220 includes the information element that allows to remove the identifier of the cell quality measurement in the SCG, and when the radio link failure (RLF) in the SCG is detected, the cell setting unit 240 stops the quality measurement of the cell (the cell C2 in the present embodiment) included in the SCG.

The quality measuring unit 250 measures a reception quality of the cells included in the master cell group (MCG) and the secondary cell group (SCG). Specifically, the quality measuring unit 250 measures Reference Signal Received Power (RSRP), Reference Signal Received Quality (RSRQ), and the like of each cell, and transmits a report of measurement (Measurement Report) if a predetermined condition (entering condition) is fulfilled.

In particular, in the present embodiment, after a part of the resources (from the RLC layer and below) of the split bearer $B_{SP}$ in the gNB 100B (NR SgNB) is released, the quality measuring unit 250 can measure the reception quality in the SCG for a longer period than that before the release of the resources.

(3) Operation of Radio Communication System

Operation of the radio communication system 10 is explained below. Specifically, operations related to the configuration and the release of the split bearer (Split bearer via SCG) performed by the eNB 100A (LTE MeNB), the gNB 100B (NR SgNB), and the UE 200 will be explained.

(3.1) Operation at the Time of Radio Link Failure

First, operation performed at the time of the radio link failure (RLF) in the secondary cell group (SCG) will be explained with reference to FIGS. 5 to 12.

(3.1.1) Operation Example 1

Figure 5:
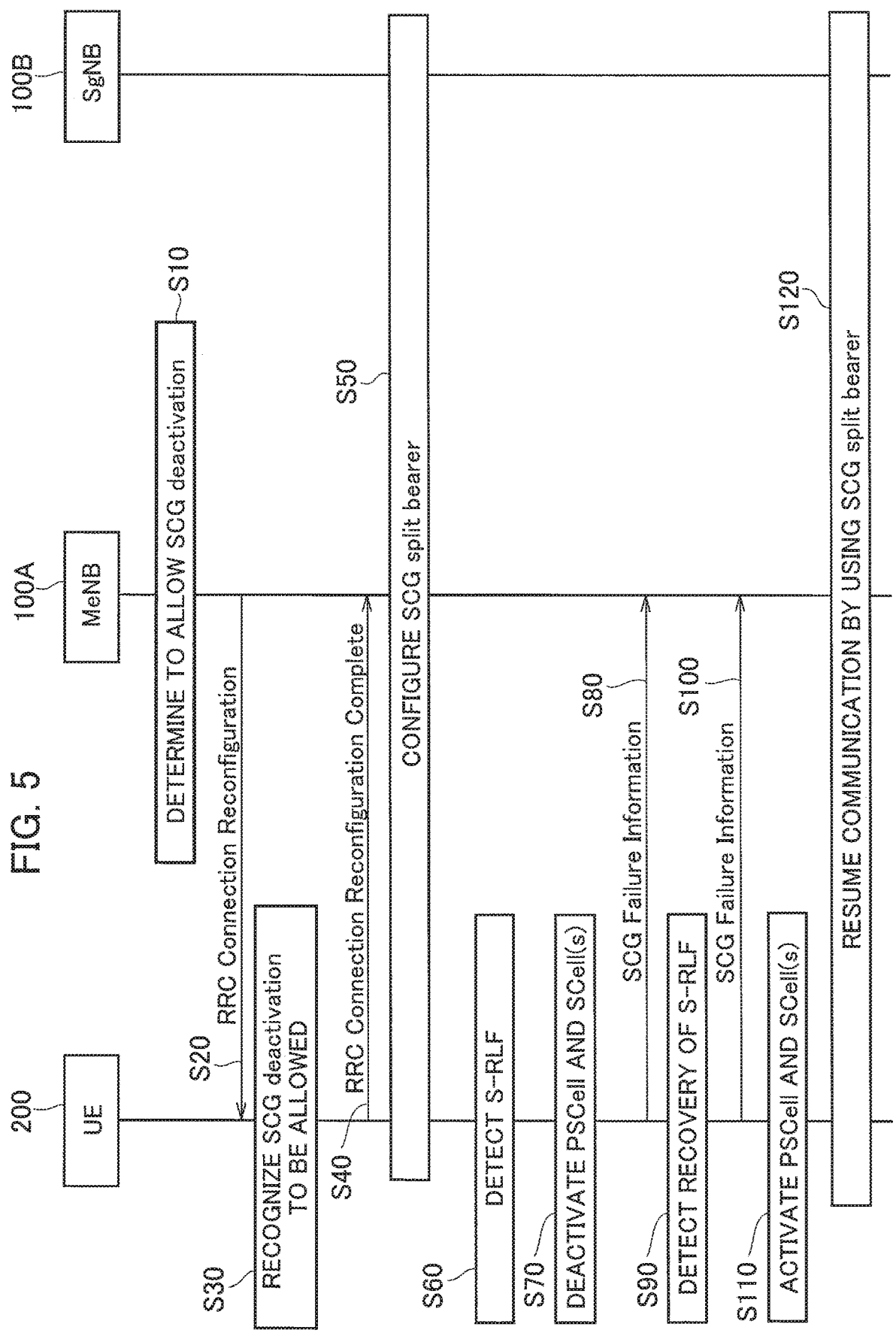
FIG. 5 is a diagram showing a control sequence of a split bearer that includes a scenario in which a radio link failure in a secondary cell group has occurred (Operation Example 1).

FIG. 5 shows a control sequence of the split bearer that includes a scenario in which the radio link failure in the secondary cell group has occurred (Operation Example 1).

As shown in FIG. 5, the eNB 100A determines to allow the UE 200 to autonomously deactivate the SCG (Step S10). Specifically, in the dual connectivity (DC) of the LTE (for example, Release-12), the UE 200 is usually not authorized to autonomously deactivate the SCG. More specifically, it is stipulated in the LTE that even when the RLF is detected, the UE 200 cannot deactivate or activate the SCG if there is no instruction from the eNB 100A and the like (for example, refer to 3GPP R2-144062 and 3GPP R2-144721).

Furthermore, if not determined so at Step S10, the UE 200 cannot autonomously deactivate the SCG.

The eNB 100A transmits to the UE 200 the RRC Connection Reconfiguration that includes the information element to allow the UE 200 to deactivate the SCG (Step S20). Based on the information element, the UE 200 recognizes that it is allowed to autonomously deactivate the SCG (Step S30).

Based on the RRC Connection Reconfiguration, the UE 200 performs a configuration modification process of the RRC layer associated with the configuration of the split bearer in the SCG, and transmits to the eNB 100A the RRC Connection Reconfiguration Complete that indicates that the configuration modification process is completed (Step S40). Accordingly, the split bearer $B_{SP}$ is configured (Step S50). As explained above, the split bearer $B_{SP}$ is referred to as the Split bearer via SCG, but in FIG. 5, the split bearer $B_{SP}$ is appropriately called as "SCG split bearer" for convenience.

FIG. 6 shows a configuration example of the split bearer $B_{SP}$ (Split bearer via SCG) (Operation Example 1). As shown in FIG. 6, the split bearer $B_{SP}$ that is the Split bearer via SCG (shown with a thick line) splits at the $PDCP_{NR}$ of the gNB 100B toward the eNB 100A. Furthermore, a path of the configurable bearers (not limited to the split bearers) (refer to 3GPP TR38.804) is indicated by a thin line.

The split bearer $B_{SP}$ that is split toward the eNB 100A provides a logical communication path to the UE 200 via the $RLC_{LTE}$ and the $MAC_{LTE}$ of the eNB 100A. Moreover, the split bearer $B_{SP}$ provides a logical communication path to the UE 200 via the $RLC_{NR}$ and the $MAC_{NR}$ of the gNB 100B. In the present operation example, the split bearer $B_{SP}$ is only deactivated and not released, and the configuration of the split bearer $B_{SP}$ is maintained in a state shown in FIG. 6.

Next, the UE 200 detects the RLF in the SCG (S-RLF) (Step S60). Specifically, as explained above, the UE 200 detects the RLF in the SCG based on the detection condition of the RLF (for example. Chapter 10.1.6 of TS36.300).

Because the autonomous deactivation of the SCG is allowed, the UE 200 deactivates the cell included in the SCG (Step S70). Specifically, the UE 200 deactivates the Primary SCell (PSCell) and the Secondary Cell (SCell). Note that, as explained above, "deactivation" means to retain the resources used for configuring the split bearer $B_{SP}$ without releasing, and not to use those resources for data transmission/reception (equivalent to RRC Idle state).

Moreover, the UE 200 transmits to the eNB 100A the failure notification (SCG Failure Information) that indicates that the S-RLF has occurred (Step S80).

Subsequently, upon detecting recovery of the S-RLF, the UE 200 transmits the SCG Failure Information that indicates that the S-RLF is recovered (Steps S90 and S100).

The UE 200 activates the cells (PSCell and SCell) that were deactivated at Step S70 (Step S110).

As a result, the communication is resumed by using the reactivated split bearer $B_{SP}$ (SCG split bearer) (Step S120).

In this way, because the UE 200 can autonomously deactivate the SCG when the S-RLF is detected, the UE 200 performs measurement reporting (transmitting Measurement Report) for a longer period than that when the SCG is in an active state. Accordingly, the power consumption of the UE 200 is reduced. Moreover, because the split bearer $B_{SP}$ itself retains the configuration, the signaling caused due to the repeated release and configuration of the split bearer, too, can be suppressed.

(3.1.1a) Operation Example 1a

Figure 7:
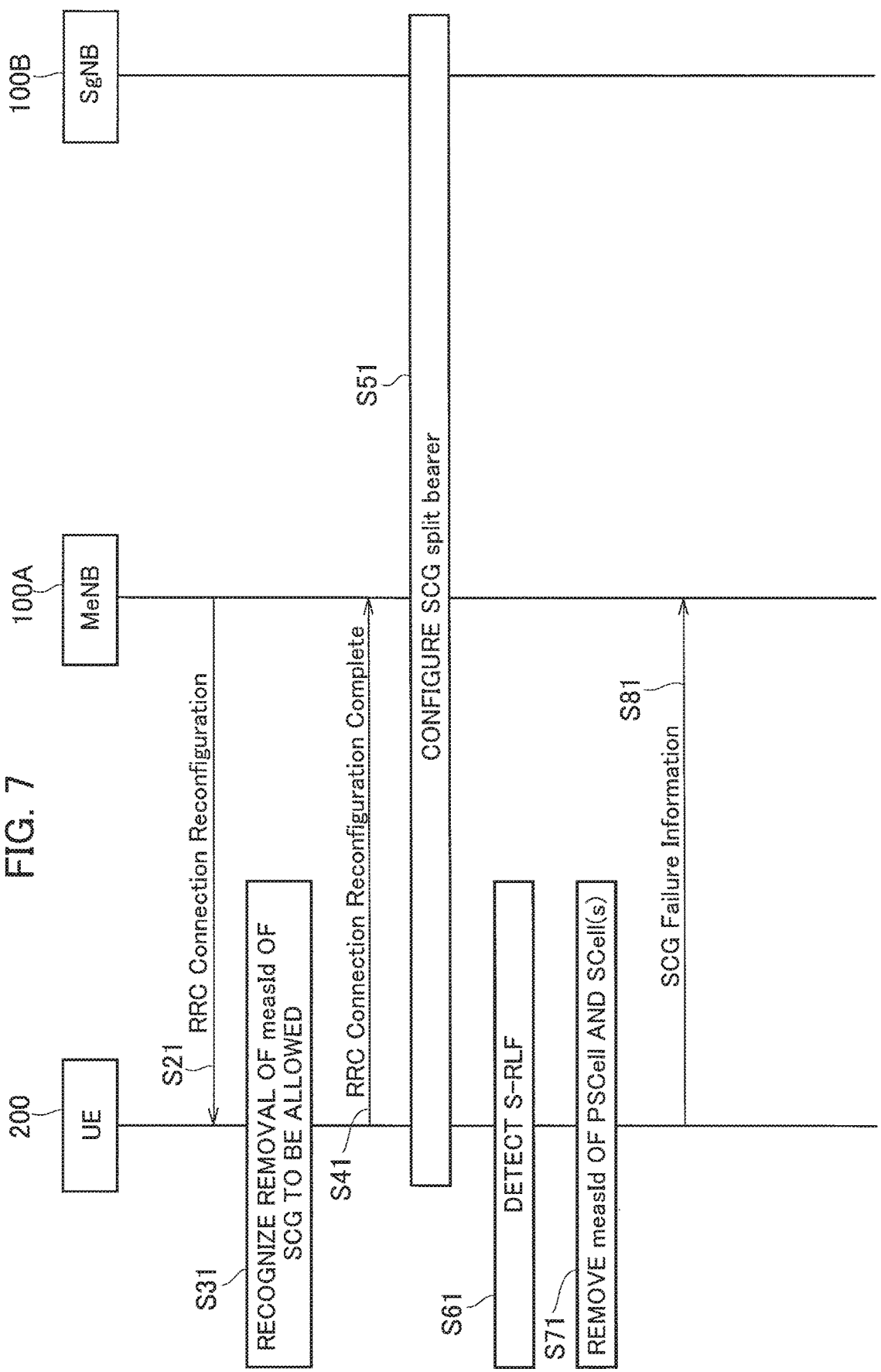
FIG. 7 is a diagram showing another control sequence of the split bearer that includes the scenario in which the radio link failure in the secondary cell group has occurred (Operation Example 1a).

FIG. 7 shows another control sequence of the split bearer that includes the scenario in which the radio link failure in the secondary cell group has occurred (Operation Example 1a). Operations that are different from that of Operation Example 1 explained above will be mainly explained below.

In Operation Example 1a, compared to Operation Example 1, the RRC message that includes the information element that allows the UE 200 to remove the MeasId that is used for identifying the quality measurement performed by the UE 200 is used.

Specifically, as shown in FIG. 7, the RRC Connection Reconfiguration that includes the information element that allows the UE 200 to remove the MeasId that is used for identifying the quality measurement performed by the UE 200 of the cells (PSCell and SCell) included in the SCG is transmitted to the UE 200 (Step S21).

The UE 200 recognizes, based on the received information element, that the UE 200 is allowed to autonomously remove the MeasId that corresponds to the cell included in the SCG (Step S31). The processes performed at Steps S41 and S51 are the same as that performed at Steps S40 and S50 shown in FIG. 5.

Next, the UE 200 detects the RLF in the SCG (S-RLF) (Step S61). Specifically, as explained above, the UE 200 detects the RLF in the SCG based on the detection condition of the RLF.

Because the UE 200 is allowed to autonomously remove the MeasId that corresponds to the cell included in the SCG, the UE 200 removes the MeasId (Step S71). Specifically, the UE 200 removes the MeasIds that correspond to the PSCell and the SCell. As explained above, in the present embodiment, as the MeasId that corresponds to the cell included in the SCG, the MeasId that corresponds to the cell C2 is removed. Note that, the MeasId can be represented by using a predetermined number of integers, and a plurality of the MeasIds can be mapped to one cell.

Once the UE 200 removes the MeasId, the contents of the quality measurement and the reporting (measurement report) cannot be recognized, and, as a result, the quality measurement and the reporting (Measurement report) are stopped.

Moreover, the UE 200 transmits to the eNB 100A the failure notification (SCG Failure Information) that indicates that the S-RLF has occurred (Step S81).

Furthermore, the information element explained above can be an information element that indicates whether the UE 200 can autonomously remove the MeasId when the S-RLF occurs. The autonomous removal of the MeasId by the UE 200 is, for example, as stipulated in Chapter 5.5.2.2a of 3GPP TS36.331, primarily allowed when the serving cell is not configured, but, in the present embodiment, even when the radio link failure (RLF) in the SCG occurs, it is possible to instruct whether to allow the UE 200 to autonomously remove the MeasId.

On the ether hand, if the information element is not included, the UE 200 does not remove the MeasId, and performs operation according to the stipulations of the conventional dual connectivity.

In this manner, because the UE 200 can autonomously remove the MeasId that corresponds to the cell included in the SCG when the S-RLF is detected, upon detecting the S-RLF, the UE 200 does not perform the measurement report related to the SCG. Accordingly, similar to Operation Example 1, the power consumption of the UE 200 is reduced. Moreover, because the split bearer $B_{SP}$ itself retains the configuration, the signaling caused due to the repeated release and configuration of the split bearer, too, can be suppressed.

Alternatively, instead of autonomously removing the MeasId, the UE 200 can set the MeasId to a disabled state. In other words, the MeasId itself is not removed, and can be set such that the MeasId cannot be used. Alternatively, the UE 200 can overwrite the existing MeasId with a dummy MeasId. By using such a configuration, the measurement report can be stopped.

Furthermore, configurations of Operation Example 1 and Operation Example 1a explained above can be used together. In other words, the UE 200 can deactivate the cell included in the SCG and remove the MeasId that corresponds to the cell included in the SCG. Moreover, in such a configuration, the UE 200 can perform only one of the processes that is executed first.

(3.1.2) Operation Example 2

Figure 8:
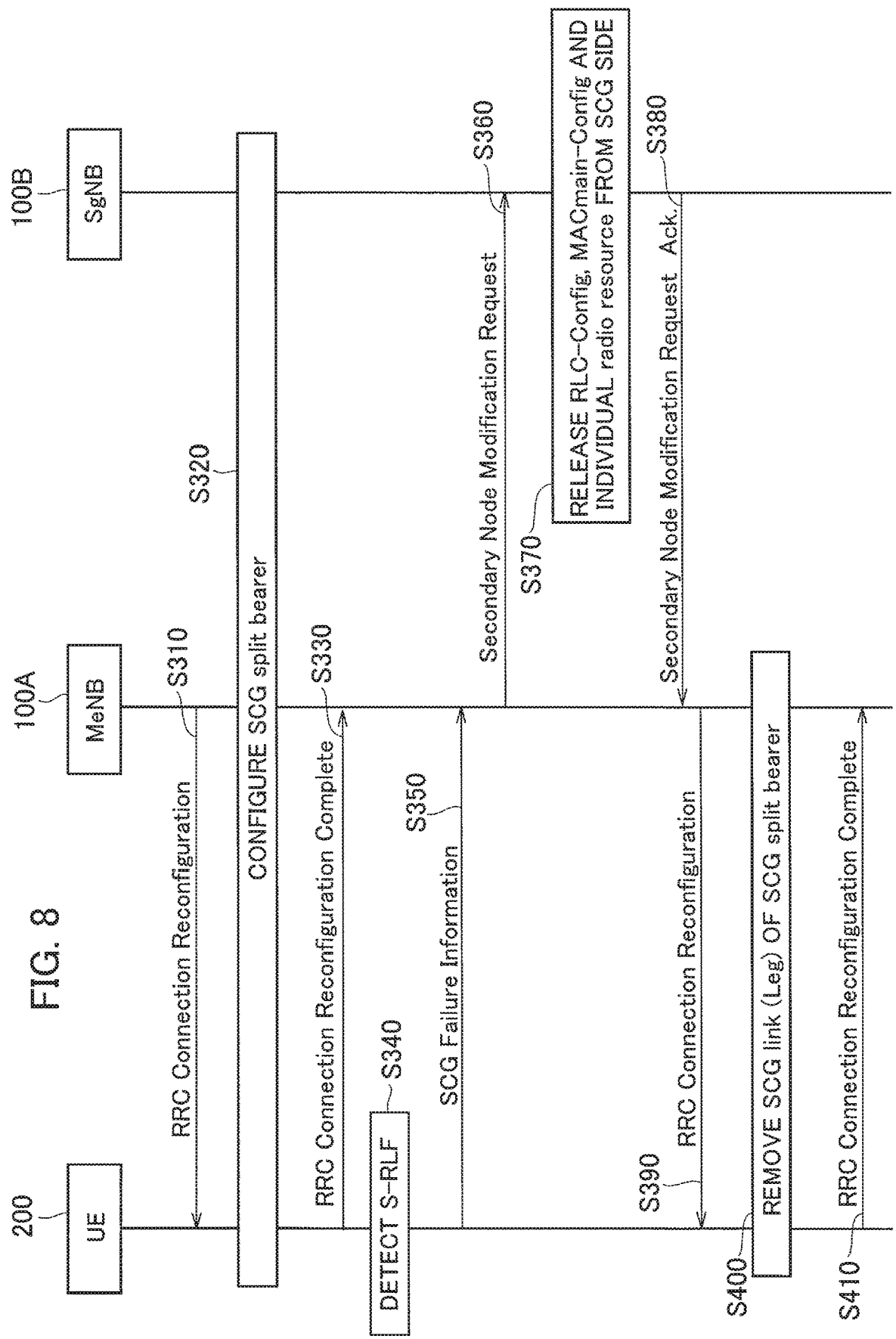
FIG. 8 is a diagram showing still another control sequence of the split bearer that includes the scenario in which the radio link failure in the secondary cell group has occurred (Operation Example 2).

FIG. 8 shows still another control sequence of the split bearer that includes the scenario in which the radio link failure in the secondary cell group has occurred (Operation Example 2). In the following explanation, explanation of the operations that are similar to that of Operation Example 1 is appropriately omitted.

Furthermore, the combination of a transmission destination (LTE MeNB or NR SgNB) of the SCG Failure Information and a transmitting entity of the RRC message (LTE MeNB or NR SgNB) is different in Operation Examples 2 to 5.

As shown in FIG. 8, the eNB 100A transmits to the UE 200 the RRC Connection Reconfiguration that requests the configuration of the split bearer $B_{SP}$ (SCG split bearer) (Step S310).

Based on the received RRC Connection Reconfiguration, the UE 200 configures the split bearer $B_{SP}$ and transmits to the eNB 100A the RRC Connection Reconfiguration Complete (Steps S320 and S330).

Next, upon detecting the RLF in the SCG (S-RLF), the UE 200 transmits to the eNB 100A the failure notification (SCG Failure Information) that indicates that the S-RLF has occurred (Steps S340 and S350).

Based on the received SCG Failure Information, the eNB 100A transmits to the gNB 100B the Secondary Node Modification Request (resource modification request) (Step S360).

The gNB 100B releases, based on the received Secondary Node Modification Request, RLC-Config, MACmain-Config, and individual radio resources (radio resources) from the SCG side. Specifically, the gNB 100B releases the resources of the $RLC_{NR}$, the $MAC_{NR}$, and the physical layer associated with the split bearer $B_{SP}$ (Step S370).

The gNB 100B transmits to the eNB 100A Secondary Node Modification Request Acknowledgment that indicates that the resources are released (Step S330).

The eNB 100A transmits to the UE 200, based on the received Secondary Node Modification Request Acknowledgment, the RRC Connection Reconfiguration that requests modification of the configuration of the split bearer $B_{SP}$ (Step S390).

The UE 200 removes, based on the received RRC Connection Reconfiguration, SCG link (Leg) that constitutes the split bearer $B_{SP}$ (SCG split bearer) (Step S400). Specifically, the UE 200 releases the RLC-Config, the MACmain-Config, and the individual radio resources (radio resources) that constitute the split bearer $B_{SP}$ from the SCG side, that is, releases the resources of the $RLC_{NR}$, the $MAC_{NR}$, and the physical layer associated with the split bearer $B_{SP}$.

The UE 200 transmits to the eNB 100A the RRC Connection Reconfiguration Complete that indicates that the SCG link (Leg) is removed (Step S410).

Figure 9:
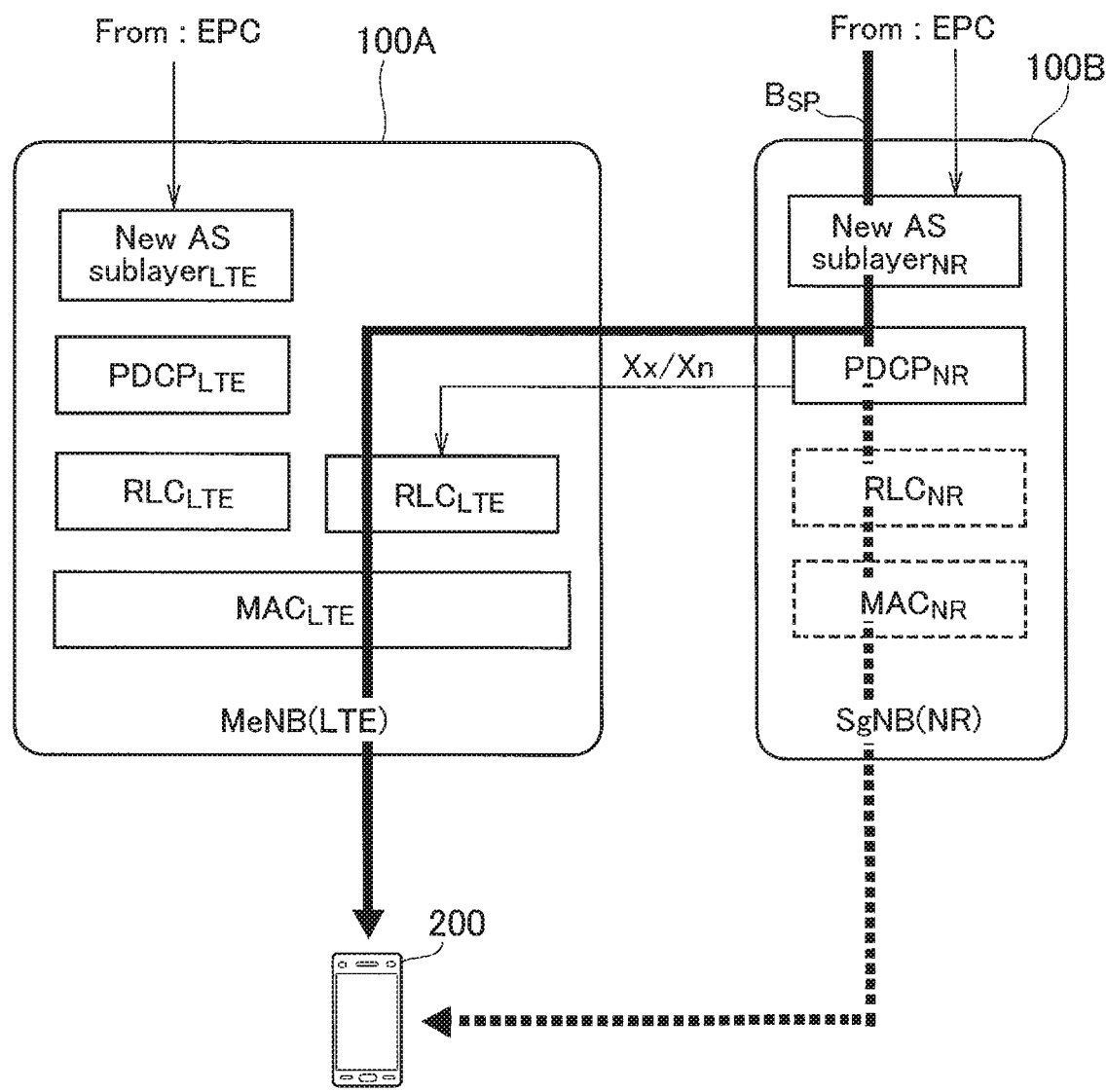
FIG. 9 is a diagram showing a configuration example of the split bearer $B_{SP}$ (Split bearer via SCG) (Operation Example 2).

FIG. 9 shows a configuration example of the split bearer $B_{SP}$ (Split bearer via SCG) (Operation Example 2). As shown in FIG. 9, because the resources from the $RLC_{NR}$ layer and below of the gNB 100B are released, the split bearer $B_{SP}$ (the resources that constitute the split bearer $B_{SP}$) within a section that directly moves toward the UE 200 from the gNB 100B (indicated by a dotted line in the figure) is released.

In this manner, when the S-RLF is detected, a part of the split bearer $B_{SP}$, specifically, the resources of the SCG is released. Therefore, the UE 200 can perform the measurement reporting (transmitting Measurement Report) for a longer period than that when the SCG is in the active state. Accordingly, similar to Operation Example 1, the power consumption of the UE 200 is reduced. Moreover, because the split bearer $B_{SP}$ at the MCG side itself retains the configuration, the signaling caused due to the repeated release and configuration of the split bearer can be suppressed.

Furthermore, in the present operation example, because the resources of the SCG are released, wastage of the SCG resources that cannot actually be used can be eliminated. Specifically, as explained above, because the RLC-Config, the MACmain-Config, and the individual radio resources (these resources can include common radio resources) from the SCG side are released, such configuration can contribute to efficient utilization of the resources.

(3.1.3) Operation Example 3

Figure 10:
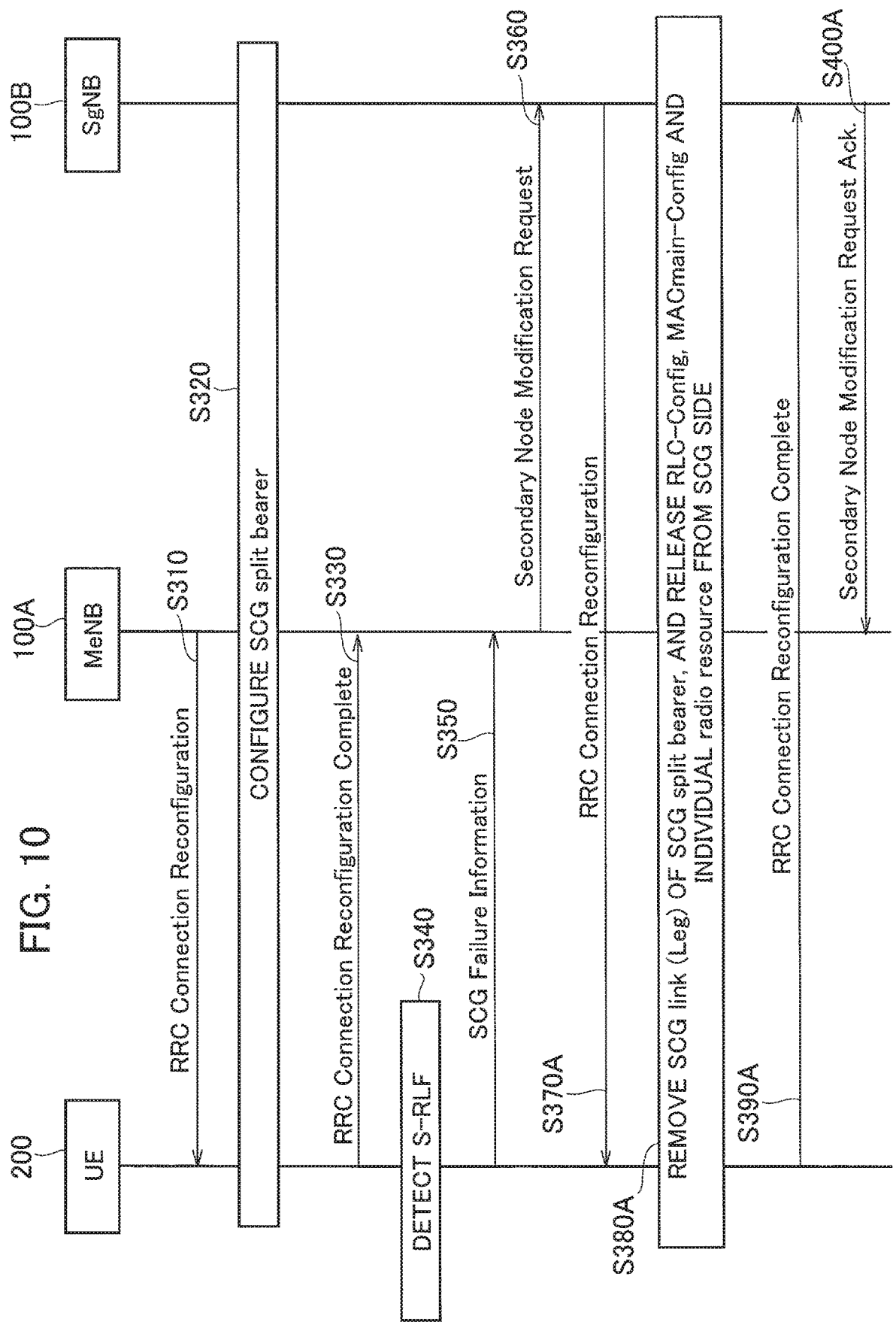
FIG. 10 is a diagram showing still another control sequence of the split bearer that includes the scenario in which the radio link failure in the secondary cell group has occurred (Operation Example 3).

FIG. 10 shows still another control sequence of the split bearer that includes the scenario in which the radio link failure in the secondary cell group has occurred (Operation Example 3). Operations that are different from that of Operation Example 2 will be mainly explained below.

In the present operation example, compared to Operation Example 2, instead of the eNB 100A (LTE MeNB), the gNB 100B (NR SgNB) transmits the RRC message. Processes performed at Steps S310 to S360 shown in FIG. 10 are the same as the processes performed at Steps S310 to S360 shown in FIG. 8.

Based on the received Secondary Node Modification Request, the gNB 100B transmits to the UE 200 the RRC Connection Reconfiguration (Step S370A). The removal of the SCG link (Leg) that constitutes the split bearer $B_{SP}$ (SCG split bearer) and the release of the RLC-Config, the MACmain-Config, and the individual radio resources (radio resources) from the SCG side are instructed via that RRC Connection Reconfiguration.

The gNB 100B and the UE 200 remove the SCG link (Leg) and release these resources (Step S380A).

The UE 200 transmits to the gNB 100B the RRC Connection Reconfiguration Complete that indicates that the SCG link (Leg) is removed and the resources are released (Step S390A).

The gNB 100B transmits to the eNB 100A, based on the received RRC Connection Reconfiguration Complete, the Secondary Node Modification Request Acknowledgment that indicates that the resources are released (Step S400A).

Although the entity that transmits the RRC message is different, an effect that is the same as that obtained in Operation Example 2 can be obtained by using the configuration of the present operation example.

(3.1.4) Operation Example 4

Figure 11:
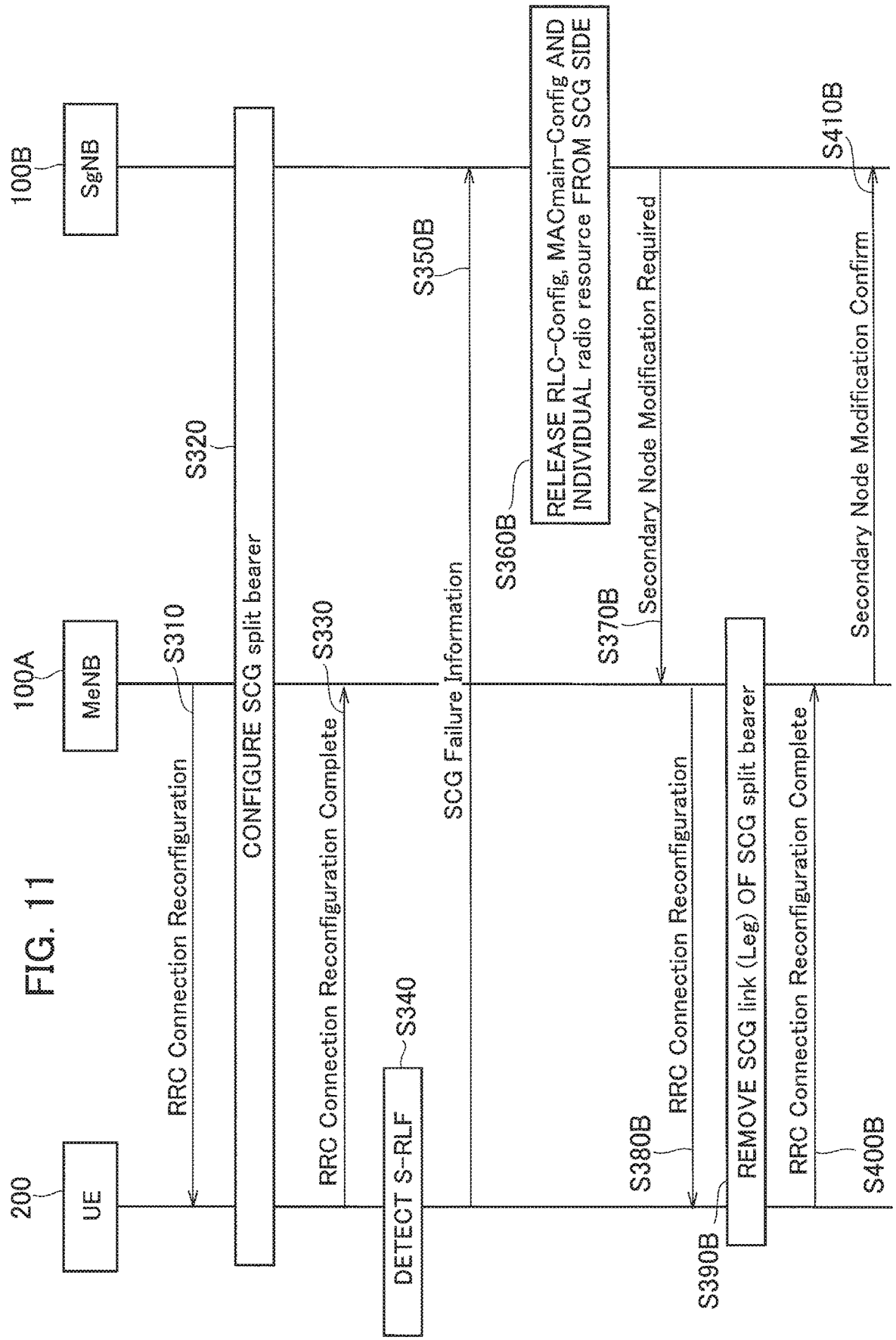
FIG. 11 is a diagram showing still another control sequence of the split bearer that includes the scenario in which the radio link failure in the secondary cell group has occurred (Operation Example 4).

FIG. 11 shows still another control sequence of the split bearer that includes the scenario in which the radio link failure in the secondary cell group has occurred (Operation Example 4). Operations that are different from that of Operation Example 2 will be mainly explained below.

In the present operation example, instead of the eNB 100A (LTE MeNB) in Operation Example 2, the SCG Failure Information is transmitted to the gNB 100B (NR SgNB). Processes performed at Steps S310 to S343 shown in FIG. 11 are the same as the processes performed at Steps S310 to S340 shown in FIG. 8.

The UE 200 transmits to the gNB 100B the failure notification (SCG Failure Information) that indicates that the S-RLF has occurred (Step S3503).

The gNB 100B releases, based on the received SCG Failure Information, the RLC-Config, the MACmain-Config, and the individual radio resources (radio resources) from the SCG side (Step S360B).

After releasing the resources, the gNB 100B transmits to the eNB 100A Secondary Node Modification Required that indicates that configuration modification on the SCG side is required (Step S370B).

The eNB 100A transmits to the UE 200, based on the received Secondary Node Modification Required, the RRC Connection Reconfiguration that requests modification of the configuration of the split bearer $B_{SP}$ (Step S380B). Processes performed at Steps S390B and S400B shown in FIG. 11 are the same as the processes performed at Steps S400 and S410 shown in FIG. 8.

The eNB 100A transmits to the gNB 100B, based on the received RRC Connection Reconfiguration Complete, Secondary Node Modification Confirm that indicates that the configuration modification on the SCG side is completed (Step S410B).

Even when the destination to which the SCG Failure Information is transmitted is different, the same effect as that obtained in Operation Example 2 can be obtained by using the configuration of the present operation example.

(3.1.5) Operation Example 5

Figure 12:
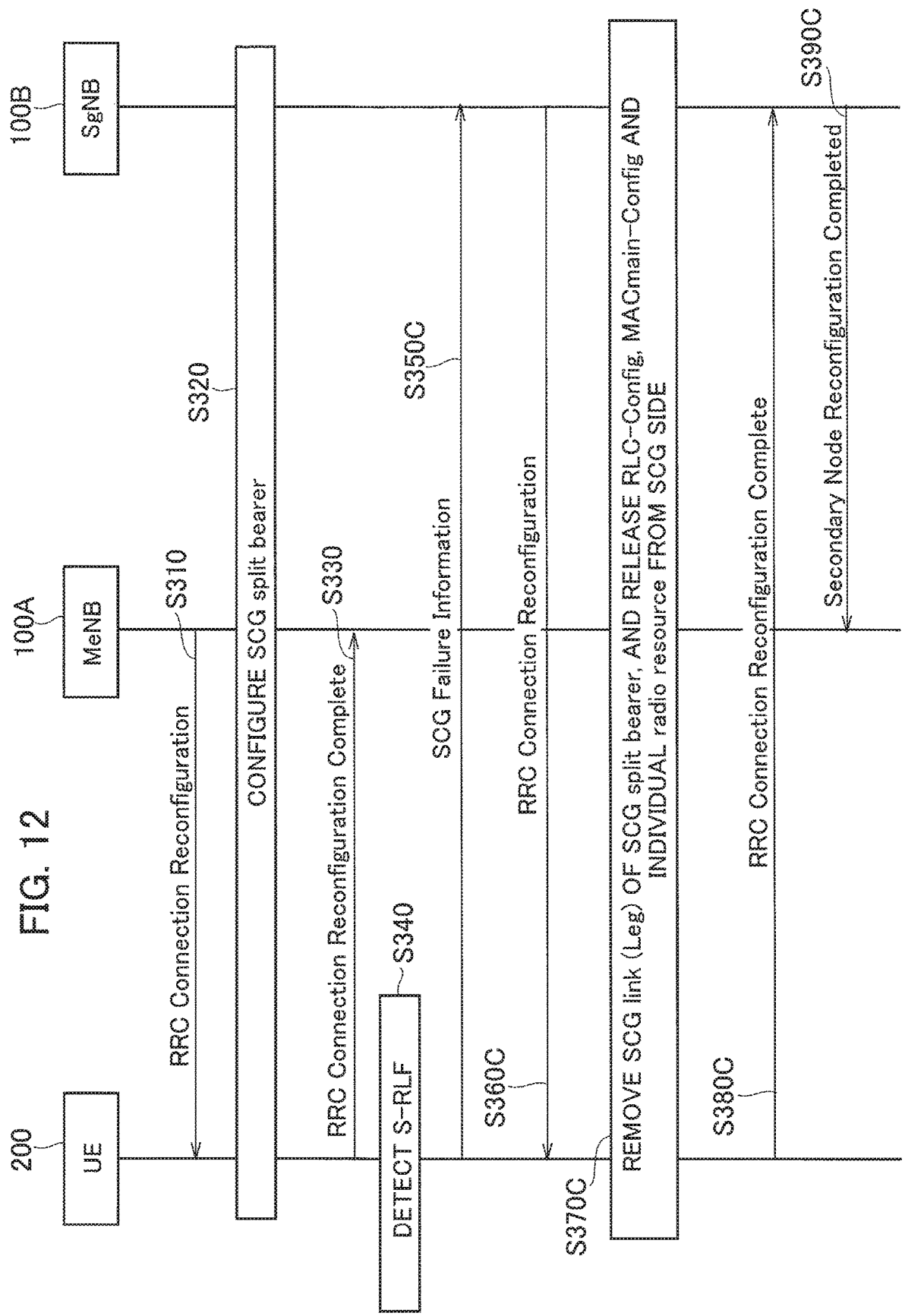
FIG. 12 is a diagram showing still another control sequence of the split bearer that includes the scenario in which the radio link failure in the secondary cell group has occurred (Operation Example 5).

FIG. 12 shows still another control sequence of the split bearer that includes the scenario in which the radio link failure in the secondary cell group has occurred (Operation Example 5). Operations that are different from that of Operation Example 2 will be mainly explained below.

In the present operation example, compared to Operation Example 2, instead of the eNB 100A (LTE MeNB), the SCG Failure Information is transmitted to the gNB 100B (NR SgNB), and instead of the eNB 100A (LTE MeNB), the gNB 100B (NR SgNB) transmits the RRC message. Processes performed at Steps S310 to S340 shown in FIG. 12 are the same as the processes performed at Steps S310 to S340 shown in FIG. 8.

The UE 200 transmits to the gNB 100B the failure notification (SCG Failure Information) that indicates that the S-RLF has occurred (Step S350C).

The gNB 100B transmits to the UE 200 the RRC Connection Reconfiguration based on the received SCG Failure Information (Step S360C). The removal of the SCG link (Leg) that constitutes the split bearer $B_{SP}$ (SCG split bearer) and the release of the RLC-Config, the MACmain-Config, and the individual radio resources (radio resources) from the SCG side are instructed via that RRC Connection Reconfiguration.

The gNB 100B and the UE 200 remove the SCG link (Leg) and release these resources (Step S370C).

The UE 200 transmits to the gNB 100B the RRC Connection Reconfiguration Complete that Indicates that the SCG link (Leg) is removed and the resources are released (Step S380C).

The gNB 100B transmits to the eNB 100A, based on the received RRC Connection Reconfiguration Complete, Secondary Node Reconfiguration Completed that indicates that the removal of the SCG link (Leg) that constitutes the split bearer $B_{SP}$ (SCG split bearer) and the release of the RLC-Config, the MACmain-Config, and the individual radio resources (radio resources) from the SCG side is completed (Step S390C).

Even if the destination to which the SCG Failure Information is transmitted and the entity that transmits the RRC message are different, the same effect as that obtained in Operation Example 2 can be obtained by using the configuration of the present operation example.

(3.2) Configuration of Split Bearer After Releasing Split Bearer

Next, operations related to the configuration of the split bearer $B_{SP}$ performed after a part of the resources from the SCG side (split bearer $B_{SP}$) is released in Operation Examples 2 to 5 explained above will be explained.

(3.2.1) Operation Example 6

Figure 13:
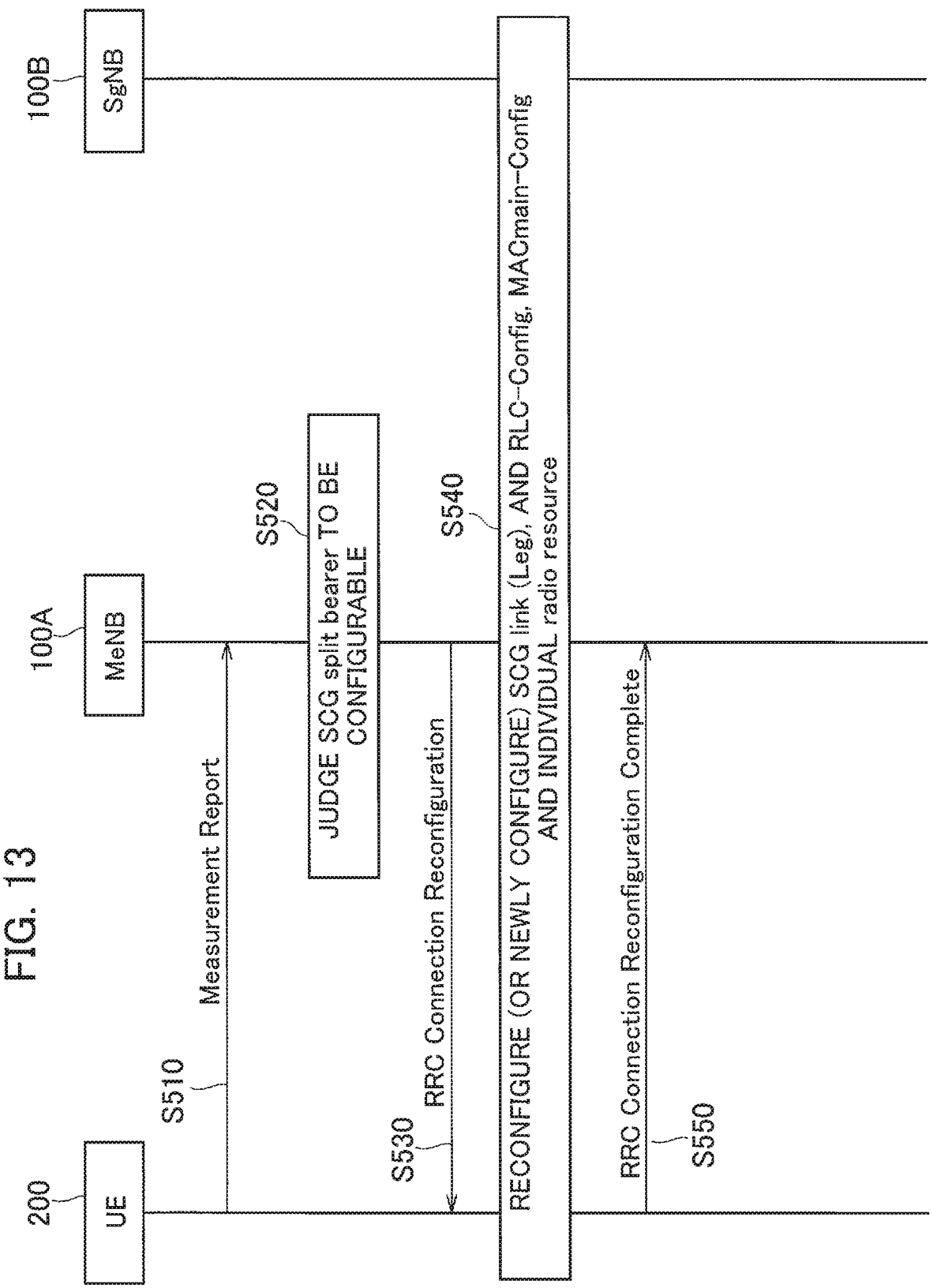
FIG. 13 is a diagram showing a configuration sequence of the split bearer $B_{SP}$ after a part of resources from SCG side (split bearer $B_{SP}$) is released (Operation Example 6).

FIG. 13 shows a configuration sequence of the split bearer $B_{SP}$ after a part of the resources from the SCG side (split bearer $B_{SP}$) is released (Operation Example 6). In Operation Example 6, the eNB 100A (LTE MeNB) controls the configuration of the split bearer $B_{SP}$.

As shown in FIG. 13, after a part of the resources from the SCG side (split bearer $B_{SP}$) is released, the UE 200 periodically transmits to the eNB 100A the report of measurement (Measurement Report) (Step S510).

The eNB 100A judges, based on the received report of measurement, whether the split bearer in the SCG, specifically, the split bearer $B_{SP}$ (refer to FIG. 6) is configurable (Step S520).

At this step, when the reception quality of a cell included in the report of measurement fulfills the predetermined condition, then it can be judged that the split bearer $B_{SP}$ is configurable.

Furthermore, depending on the location of the UE 200, and the like, the split bearer $B_{SP}$ may be judged as configurable in the same SCG (specifically, the NR SgNB) as that before a part of the resources from the SCG side is released, or may be judged as configurable in the different SCG than that before a part of the resources from the SCG side is released.

The eNB 100A transmits to the UE 200 the RRC Connection Reconfiguration that requests to configure the split bearer $B_{SP}$ (S530).

Based on the received RRC Connection Reconfiguration, the UE 200 either reconfigures the SCG link (Leg) that constitutes the split bearer $B_{SP}$ (SCG split bearer), and the RLC-Config, the MACmain-Config, and the individual radio resources (radio resource) from the SCG side, or configures a new split bearer $B_{SP}$ (Step S540).

When configuring the split bearer $B_{SP}$ in the same SCG, the split bearer $B_{SP}$ is reconfigured. Specifically, only the SCG link (Leg) that is removed, and the RLC-Config, the MACmain-Config, and the individual radio resources (radio resource) from the SCG side that are released in the operation examples explained above are reconfigured. In other words, the other resources ($PDCP_{NR}$, $RLC_{LTE}$, and the like) that constitute the split bearer $B_{SP}$ are used in the retained state as is.

On the other hand, when the split bearer $B_{SP}$ is configured in a different SCG than that before a part of the resources from the SCG side is released, a new SCG split bearer is configured. When a new SCG split bearer is configured, the retained resources of the split bearer $B_{SP}$ are released.

The UE 200 transmits to the eNB 100A the RRC Connection Reconfiguration Complete that indicates that the SCG link (Leg) and the resources are reconfigured, or a new SCG split bearer is configured (Step S550).

According to the present operation example, when the split bearer $B_{SP}$ is judged as configurable in the same SCG as that before a part of the resources from the SCG side is released, the split bearer $B_{SP}$ is reconfigured by utilizing the retained resources of the split bearer $B_{SP}$, thereby making it possible to decrease the signaling amount while using the resources efficiently.

(3.2.2) Operation Example 7

Figure 14:
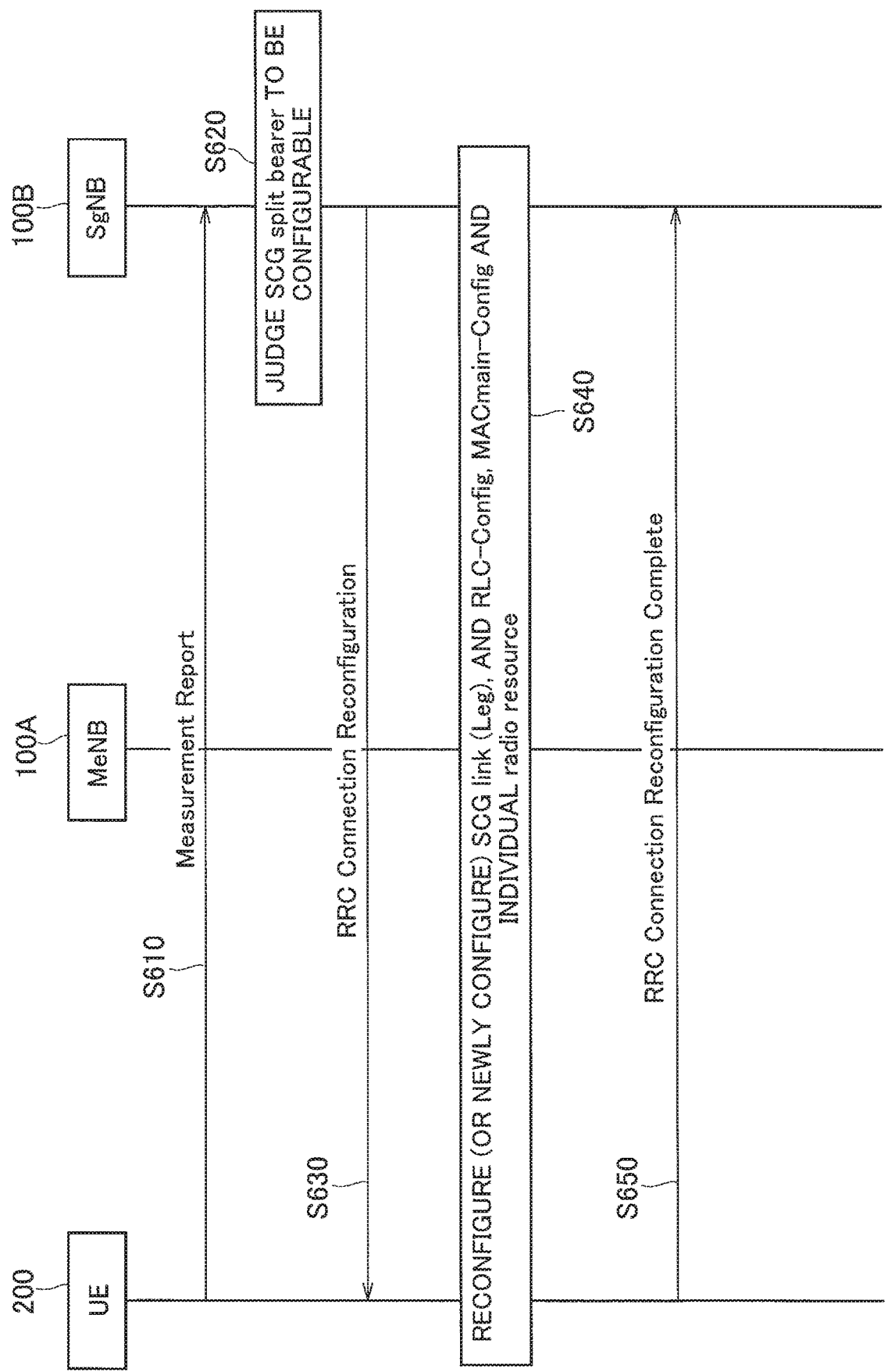
FIG. 14 is a diagram showing a configuration sequence of the split bearer $B_{SP}$ after a part of the resources from the SCG side (split bearer $B_{SP}$) is released (Operation Example 7).

FIG. 14 shows a configuration sequence of the split bearer $B_{SP}$ after a part of the resources from the SCG side (split bearer $B_{SP}$) is released (Operation Example 7). In Operation Example 7, the gNB 100B (NR SgNB) controls the configuration of the split bearer $B_{SP}$.

Operations that are different from that of Operation Example 6 will be mainly explained below. Operation Example 7 differs from Operation Example 6 in that a controlling entity is the gNB 100B instead of the eNB 100A, but the processing content of each step is the sane as that of Operation Example 6.

Specifically, processes performed at Steps S610 to S650 shown in FIG. 14 respectively correspond to the processes performed at Steps S510 to S550 shown in FIG. 13.

(4) Effects and Advantages

The following operational effects can be obtained according to the embodiments explained above. Specifically, according to Operation Example 1, as explained above, because the UE 200 can autonomously deactivate the SCG when the S-RLF is detected, the UE 200 can perform the measurement reporting (transmitting Measurement Report) for a longer period than that when the SCG is in the active state.

More specifically, when the SCG is in the active state, the UE 200 performs Layer 3 measurement at the same frequency (200 milliseconds (ms)) as that when in the RRC Connected state, thereby making it difficult to reduce the power consumption. According to Operation Example 1, because the measurement reporting can be performed for a longer period than that when in the RRC Connected state while maintaining the split bearer $B_{SP}$, the power consumption of the UE 200 can be reduced.

In other words, it is difficult to reduce the power consumption of the UE 200 by simply retaining the SCG without removing to suppress the increase in the signaling amount due to the release and configuration of the split bearer $B_{SP}$.

Moreover, according to Operation Example 1a, as explained above, because the UE 200 autonomously removes the MeasId that corresponds to the SCG when the S-RLF is detected, the UE 200 can stop the measurement report related to the SCG. Therefore, similar to Operation Example 1, the power consumption of the UE 200 can be reduced.

According to Operation Examples 2 to 5 explained above, because a part of the split bearer $B_{SP}$, specifically, the resources of the SCG are released when the S-RLF is detected, in addition to the effects explained above, the resources can be utilized effectively. In other words, because the released resources can be allocated to other UEs, such allocation of the resources contributes to the efficient operation of the entire radio communication system 10.

Because no complicated control is performed in Operation Example 1, it is preferable from the viewpoint of suppressing the signaling amount; however, because the resources (for example, UE-specific individual resources for beam forming such as PUCCH of PSCell, CSI-RS in PSCell and SCell) of the SCG (split bearer $B_{SP}$) are retained, effective utilization of the resources as explained in Operation Examples 2 to 5 cannot be expected.

Moreover, according to Operation Examples 6 and 7, as explained above, because when the split bearer $B_{SP}$ is judged as configurable in the same SCG as that before a part of the resources from the SCG side is released, the split bearer $B_{SP}$ is reconfigured by utilizing the retained resources of the split bearer $B_{SP}$, the signaling amount can be decreased while utilizing the resources efficiently.

(5) Other Embodiments

Although the contents of the present invention have been explained above by using the embodiments, it is obvious for a person skilled in the art that the present invention is not limited to those embodiments and that various modifications and improvements thereof are possible.

For example, in the embodiments explained above, the eNB 100A is a radio base station (eNB) of the LTE system and constitutes the master base station, whereas the gNB 100B is a radio base station (gNB) of the NR system and constitutes the secondary base station. However, this configuration can be reversed. In other words, the radio base station (gNB) of the NR system can constitute the master base station and the radio base station (eNB) of the LTE system can constitute the secondary base station.

Furthermore, the block diagrams used for explaining the embodiments (FIGS. 3 and 4) show functional blocks. Those functional blocks (structural components) can be realized by a desired combination of hardware and/or software. Means for realizing each functional block is not particularly limited. That is, each functional block may be realized by one device combined physically and/or logically. Alternatively, two or mere devices separated physically and/or logically may be directly and/or indirectly connected (for example, wired and/or wireless) to each other, and each functional block may be realized by these plural devices.

Figure 15:
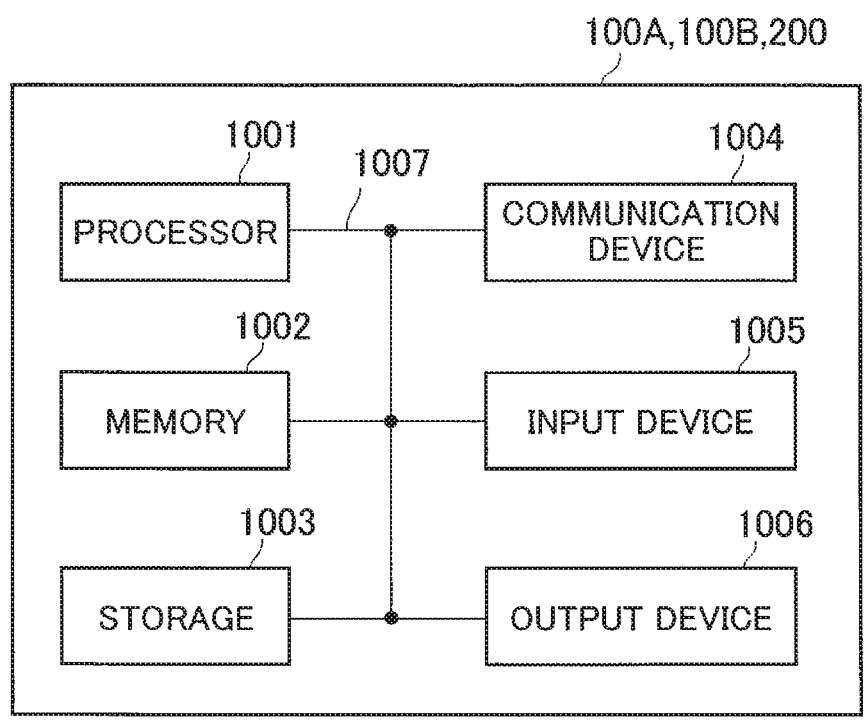
FIG. 15 is a diagram showing an example of a hardware configuration of the eNB 100A, 100B and the UE 200.

Furthermore, the eNB 100A, the gNB 100B, and the UE 200 (devices) explained above can function as a computer that performs the processing of transmission power control of the present invention. FIG. 15 is a diagram showing an example of a hardware configuration of the devices. As shown in FIG. 15, each of the devices can be configured as a computer device including a processor 1001, a memory 1002, a storage 1003, a communication device 1004, an input device 1005, an output device 1006, and a bus 1007.

Furthermore, the functional blocks of the devices (see FIGS. 3 and 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100A (gNB 100B, hereinafter the same) can be performed by another network node (device). Moreover, functions of the eNB 100A can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The eNB 100A (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably. The base station can also be referred to as a fixed station, Node B, eNode B (eNB), gNode B (gNB), an access point, a femtocell, a small cell, and the like.

The UE 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be easily apparent to a person skilled in the art.

INDUSTRIAL APPLICABILITY

According to the radio communication system and the radio base station explained above are useful in that, even when a split bearer via a secondary cell group (SCG) is configured, it is possible to reduce the power consumption of a user device and suppress an increase in a signaling amount due to repeated release and configuration of the split bearer.

EXPLANATION OF REFERENCE NUMERALS 10 radio communication system
20 core network
100A eNB
100B gNB
110 radio communication unit
120 connection controlling unit
130 failure notification receiving unit
140 resource controlling unit
200 UE
210 radio communication unit
220 connection controlling unit
230 failure detecting unit
240 cell setting unit
250 quality measuring unit
1001 processor
1002 memory
1003 storage
1004 communication device
1005 input device
1006 output device
1007 bus

The invention claimed is:

1. A user equipment, comprising:
a receiver that receives a Radio Resource Control (RRC) message related to configuration information of a second radio base station for a split bearer that splits from the second radio base station toward a first radio base station;
a processor that releases resources related to a radio link of the second radio base station based on the RRC message when a radio link failure in the second radio base station is detected; and
a transmitter that transmits Secondary Cell Group (SCG) failure information to the first radio base station, the SCG failure information being related to the radio link failure of the second radio base station,
wherein the user equipment maintains the configuration information of the second radio base station during the split of the split bearer, the user equipment retaining resources for configuring the split bearer.

2. The user equipment as claimed in claim 1, wherein, the processor releases the resources related to the radio link of the second radio base station even when the user equipment is not allowed to release the resources related to the radio link of the second radio base station.

3. The user equipment as claimed in claim 1, wherein, the processor configures the split bearer in which the released radio link is reused when reconnecting to the same second radio base station.

4. The user equipment as claimed in claim 1, wherein, the split bearer that goes from a core network via the second radio base station.

5. A system that comprises a radio base station and a user equipment, wherein,
the radio base station transmits a Radio Resource Control (RRC) message related to configuration information of a second radio base station for a split bearer that splits from the second radio base station toward a first radio base station, and
the user equipment comprises:
a receiver that receives the RRC message;
a processor that releases resources related to a radio link of the second radio base station based on the RRC message when a radio link failure in the second radio base station is detected; and
a transmitter that transmits Secondary Cell Group (SCG) failure information to the first radio base station, the SCG failure information being related to the radio link failure of the second radio base station,
wherein the user equipment maintains the configuration information of the second radio base station during the split of the split bearer, the user equipment retaining resources for configuring the split bearer.

6. The system as claimed in claim 5, wherein, the split bearer that goes from a core network via the second radio base station.

7. A method of a user equipment, comprising:
receiving a Radio Resource Control (RRC) message related to configuration information of a second radio base station for a split bearer that splits from the second radio base station toward a first radio base station;
releasing resources related to a radio link of the second radio base station based on the RRC message when a radio link failure in the second radio base station is detected; and
transmitting Secondary Cell Group (SCG) failure information to the first radio base station, the SCG failure information being related to the radio link failure of the second radio base station,
wherein the user equipment maintains the configuration information of the second radio base station during the split of the split bearer, the user equipment retaining resources for configuring the split bearer.

8. The method as claimed in claim 7, wherein, the split bearer that goes from a core network via the second radio base station.

9. A user equipment, comprising:
a receiver that receives a Radio Resource Control (RRC) message related to configuration information of a second radio base station for a split bearer that splits from the second radio base station toward a first radio base station;
a processor that releases resources related to a radio link of the second radio base station based on the RRC message when a radio link failure in the second radio base station is detected; and
a transmitter that transmits Secondary Cell Group (SCG) failure information to the first radio base station, the SCG failure information being related to the radio link failure of the second radio base station, wherein the user equipment maintains the configuration information of the second radio base station until receiving the RRC message, the user equipment retaining resources for configuring the split bearer.

10. The user equipment as claimed in claim 9, wherein, the split bearer that goes from a core network via the second radio base station.

11. A system that comprises a radio base station and a user equipment, wherein,
the radio base station transmits a Radio Resource Control (RRC) message related to configuration information of a second radio base station for a split bearer that splits from the second radio base station toward a first radio base station, and
the user equipment comprises:
a receiver that receives the RRC message;
a processor that releases resources related to a radio link of the second radio base station based on the RRC message when a radio link failure in the second radio base station is detected; and
a transmitter that transmits Secondary Cell Group (SCG) failure information to the first radio base station, the SCG failure information being related to the radio link failure of the second radio base station,
wherein the user equipment maintains the configuration information of the second radio base station until receiving the RRC message, the user equipment retaining resources for configuring the split bearer.

12. The system as claimed in claim 11, wherein, the split bearer that goes from a core network via the second radio base station.

13. A method of a user equipment, comprising:
receiving a Radio Resource Control (RRC) message related to configuration information of a second radio base station for a split bearer that splits from the second radio base station toward a first radio base station;
releasing resources related to a radio link of the second radio base station based on the RRC message when a radio link failure in the second radio base station is detected; and
transmitting Secondary Cell Group (SCG) failure information to the first radio base station, the SCG failure information being related to the radio link failure of the second radio base station,
wherein the user equipment maintains the configuration information of the second radio base station until receiving the RRC message, the user equipment retaining resources for configuring the split bearer.

14. The method as claimed in claim 13, wherein, the split bearer that goes from a core network via the second radio base station.

* * * * *